(12) United States Patent
Huelsen

(10) Patent No.: US 12,128,831 B2
(45) Date of Patent: Oct. 29, 2024

(54) ROOF MODULE FOR A MOTOR VEHICLE, COMPRISING A SENSOR MODULE HAVING A HOUSING

(71) Applicant: Webasto SE, Stockdorf (DE)

(72) Inventor: Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 151 days.

(21) Appl. No.: 17/791,735

(22) PCT Filed: Feb. 3, 2021

(86) PCT No.: PCT/EP2021/052545
§ 371 (c)(1),
(2) Date: Jul. 8, 2022

(87) PCT Pub. No.: WO2021/156307
PCT Pub. Date: Aug. 12, 2021

(65) Prior Publication Data
US 2023/0026815 A1    Jan. 26, 2023

(30) Foreign Application Priority Data
Feb. 7, 2020    (DE) .................... 10 2020 103 152.1

(51) Int. Cl.
*B62D 25/06*    (2006.01)
*B60R 11/04*    (2006.01)
(Continued)

(52) U.S. Cl.
CPC .............. *B60R 11/04* (2013.01); *B62D 25/06* (2013.01); *G01S 7/027* (2021.05); *G01S 7/481* (2013.01);
(Continued)

(58) Field of Classification Search
CPC ... B62D 25/06; B60R 11/04; B60R 2011/002; G01S 7/027; G01S 7/481; G01S 7/4813;
(Continued)

(56) References Cited

U.S. PATENT DOCUMENTS 5,549,327 A    8/1996    Rusche et al.
6,227,582 B1    5/2001    Ichien
(Continued)

FOREIGN PATENT DOCUMENTS

CN    109572608 A    4/2019
DE    10036213 B4 *    8/2006    ............... B60J 10/00
(Continued)

OTHER PUBLICATIONS

Text DE10036213 (Year: 2006).*
(Continued)

*Primary Examiner* — Dennis H Pedder
(74) *Attorney, Agent, or Firm* — Fitch, Even, Tabin & Flannery, LLP

(57) ABSTRACT

A motor vehicle, in particular for a passenger car, having a support structure, a roof skin, which is disposed on the support structure, and at least one sensor module having at least one environment sensor for detecting a vehicle environment and having at least one housing for accommodating the environment sensor. The housing of the sensor module is disposed on the support structure and has a construction which collapses or is deformed when defined external forces are applied such that deformation forces, which are exerted by the sensor module on the support structure or on another roof module component, are reduced.

11 Claims, 4 Drawing Sheets

(51) Int. Cl.
    *G01S 7/02*      (2006.01)
    *G01S 7/481*     (2006.01)
    *G01S 17/931*    (2020.01)
    *B60R 11/00*     (2006.01)

(52) U.S. Cl.
    CPC ..... *G01S 17/931* (2020.01); *B60R 2011/0028* (2013.01)

(58) Field of Classification Search
    CPC ................. G01S 17/931; G01S 13/931; G01S 2013/9327; H01Q 1/3275
    USPC ............................... 296/210, 193.04, 12, 29
    See application file for complete search history.

(56) References Cited

U.S. PATENT DOCUMENTS

| | | | |
|---|---|---|---|
| 10,302,744 B1 * | 5/2019 | Krishnan | ................ B60R 11/04 |
| 2012/0153684 A1 | 6/2012 | Demmer et al. | |
| 2016/0297482 A1 | 10/2016 | Sakabe et al. | |
| 2017/0369003 A1 | 12/2017 | Williams et al. | |
| 2018/0037267 A1 | 2/2018 | Williams et al. | |
| 2019/0003895 A1 | 1/2019 | Krishnan et al. | |
| 2019/0016306 A1 | 1/2019 | Krishnan et al. | |
| 2019/0100162 A1 | 4/2019 | Furumoto | |
| 2020/0023788 A1 | 1/2020 | Frederick et al. | |

FOREIGN PATENT DOCUMENTS

| | | |
|---|---|---|
| DE | 60029511 T2 | 3/2007 |
| DE | 102006007449 A1 | 8/2007 |
| DE | 102009035733 A1 | 2/2011 |
| DE | 202011001928 U1 | 4/2012 |
| DE | 102018115498 A1 | 1/2019 |
| DE | 102017223139 A1 | 6/2019 |
| DE | 102019117556 A1 | 1/2020 |
| EP | 0683072 A1 | 11/1995 |
| EP | 2860820 A1 | 4/2015 |

OTHER PUBLICATIONS

Written Opinion of the International Searching Authority for PCT/EP2021/052545 mailed Jul. 28, 2022, in English (6 pages).

International Search Report for PCT/EP2021/052258 mailed May 7, 2021, in English and German (7 pages).

Journal—"Exciting Products from Webasto" dated Oct. 15, 2019, in English (1 page).

Journal—"Webasto zeigt auf der IAA sein 'Roof Sensor Module'" dated Sep. 4, 2019, in German with machine translation (2 pages).

Office Action issued against corresponding Chinese Application No. 202180013012.6 ; mailed Jul. 8, 2024; In Mandarin with English Machine Translation (16 pages).

* cited by examiner

ROOF MODULE FOR A MOTOR VEHICLE, COMPRISING A SENSOR MODULE HAVING A HOUSING

CROSS-REFERENCE TO RELATED APPLICATION

This application is a U.S. national phase application filed under 35 U.S.C. § 371 of International Application No. PCT/EP2021/052545, filed Feb. 3, 2021, designating the United States, which claims priority from German Patent Application Number DE 10 2020 103 152.1, filed Feb. 7, 2020, which are hereby incorporated herein by reference in its entirety for all purposes.

FIELD

The invention relates to a roof module for a motor vehicle, in particular for a passenger car, comprising the features of the preamble of claim 1.

BACKGROUND

A roof module of the kind described above is known from practice and is in particular part of a vehicle roof of a passenger car. For forming a vehicle roof, the roof module, which is a separate component, is fitted on roof side rails which are part of a vehicle body forming a vehicle shell structure. Additionally, the roof module comprises a sensor module having an environment sensor for detecting a vehicle environment and having a housing for accommodating the environment sensor. The roof module is part of an autonomously or semi-autonomously driving motor vehicle.

With previous motor vehicles or roof modules of the kind described above, the sensor module is formed as an attachment which is elevated relative to the roof skin. Thus, the sensor module forms the highest elevation of the respective vehicle. However, this also leads to an appearance that generally does not meet customer requirements.

Additionally, known sensor modules, which can comprise lidar sensors, radar sensors, optical sensors, such as cameras or the like, as environment sensors, have a housing, which is made of metal so as to be dimensionally stable and which has a high weight. This requires additional measures on the respective roof in order to meet existing safety requirements. Thus, it is necessary to integrate additional struts and/or additional sheets to ensure sufficient crash safety and to pass roof crush resistance tests required for this purpose. In case of an accident, it must be prevented that the sensor module is pushed from above into an interior of the respective vehicle and thus endangers the vehicle occupants. However, the additional struts and/or additional sheets increase the weight and cost of the roof as a whole.

SUMMARY

The object of the invention is to provide a roof module of the kind described above, which meets high requirements regarding occupant safety.

According to the invention, this object is attained by the roof module having the features of claim 1.

So the invention proposes a roof module which also has a sensor module having an environment sensor and a housing in addition to the usual elements, namely the support structure and the roof skin, the housing being disposed on the support structure and having a construction which collapses or is deformed when defined external forces are applied such that deformation forces, which are exerted by the sensor module on the support structure or on another roof module component, are reduced. This construction achieves that the housing is able to structurally yield in an accident situation such that kinetic energy is absorbed. Thus, it can be ensured that the kinetic energy is at least not fully transferred to the support structure. Additionally, it can be prevented that the sensor module pushes the support structure and/or another roof module component towards the vehicle interior and/or the sensor module itself is pushed towards the vehicle interior, which would put vehicle occupants in danger. In particular, the housing of the sensor module yields structurally due to the material and/or due to the design in a defined manner.

Preferably, the construction of the housing has a material weakening area such that the housing breaks and/or is deformed when external forces are applied.

The environment sensor of the roof according to the invention can have various designs and comprise in particular a lidar sensor, a radar sensor, an optical sensor, such as a camera, an antenna system and/or the like. Generally, the environment sensor can comprise any sensors that use electromagnetic radiation and/or acoustic waves and that are suitable for detecting the vehicle environment and/or for communicating with the vehicle environment.

In an integrated manner, the roof module according to the invention is a unit which can be fitted on a vehicle shell structure and which, because of the sensor module, comprises components that allow the respective vehicle to be driven autonomously or semi-autonomously. Thus, the invention provides a roof sensor module (RSM).

The support structure of the roof module according to the invention is in particular formed by a roof frame, which constitutes the intersection of the roof module with roof rails, which are part of a vehicle shell structure or a vehicle body and which limit the roof module in the assembled state.

In a preferred embodiment of the roof module according to the invention, the material weakening area is formed by a predetermined breaking point or by a predetermined bending area. Consequently, the housing breaks or is deformed in a defined manner when external forces act on the sensor module. The break or deformation allows the kinetic energy to be at least partly absorbed.

The material weakening area is realized, for example, by an area which is tapered regarding its material thickness and which forms the weakening area and breaks or is deformed when a defined force is applied.

It is also conceivable to realize the material weakening area by using suitable materials for the housing of the sensor module. In this case, for example, the housing is at least partly made of plastic which is provided with at least one predetermined breaking point or a predetermined bending area. It is also conceivable that the housing is a thin-walled metal housing, at least in sections, a sheet metal portion of the metal housing forming the defined material weakening area in the form of a material tapering or the like, which is deformed and/or breaks when accordingly defined forces are applied.

Alternatively or additionally, it is conceivable that the material weakening area is formed by connecting means between two sections of the housing. For example, the connecting means comprise an adhesive bond of the two sections, a rivet, which connects the two sections, a screw connection, which connects the two sections, a catch mechanism between the two sections, a welded seam or a soldered seam between the two sections. The connecting means are formed such that they detach when a defined force is applied and the two connected sections are separated.

Furthermore, the housing can have structural elements on which the material weakening area is formed. For example, the housing has a ribbing which is interrupted or tapered in the material weakening area.

In a preferred embodiment of the roof module according to the invention which meets high design requirements, the roof skin covers the environment sensor or the sensor module. Thus, the sensor module is integrated in the roof module in a harmonious manner. The roof skin only needs to also have a sensor see-through portion in the form of a window cutout or the like such that the environment sensor can detect the environment of the vehicle through this cutout. The sensor see-through portion can be formed in one piece with adjoining areas of the roof skin or also be an insert of the roof skin. In both cases, the sensor see-through portion must be transparent for the wavelengths in which the used environment sensor operates. If the environment sensor is a lidar sensor, it preferably operates within a wavelength range of approximately 905 nm or even approximately 1550 nm. A camera used as an environment sensor can operate within the wavelength range of visible light or in the infrared range. The sensor see-through portion is then transparent, in particular for these wavelengths and preferably for a wavelength range between 200 nm and 2000 nm. Advantageously, the sensor see-through portion is also transparent for radar beams.

A vehicle which is provided with the roof module according to the invention and which is an autonomously driving vehicle drives independently in an autonomous driving mode, at least without significant interference from the driver. In a semi-autonomous driving mode of an otherwise configured motor vehicle, the roof according to the invention forms a part of a driver assistance system, for example.

Generally, the roof module according to the invention forms a component in an integrated manner, in which components required for autonomously or semi-autonomously driving the respective vehicle are accommodated. The roof module, which can have a plurality of functional elements, forms a compact modular unit, which can be connected to a vehicle body or a vehicle shell structure by a vehicle manufacturer for forming the vehicle roof, the vehicle body or vehicle shell structure comprising roof rails, between which the roof module is accommodated and/or on which the roof module is mounted, or other shell structure elements for storing the roof module. It is also conceivable that the roof module is at least partly part of a vehicle shell structure.

The roof module according to the invention can be provided with a continuously fixed roof skin or also with a roof opening system which comprises a lid element by means of which a roof opening of the roof skin can be selectively opened or closed. The roof skin can also form a roof see-through portion which is a transparent fixed roof portion.

The roof skin can cover the sensor module or also have a cutout whose edges adjoin the sensor module.

In particular, the roof module according to the invention is part of a passenger car. However, it can also be used with a commercial vehicle which is designed as a delivery truck, an autonomously driving minibus, such as a people mover, or even a tractor unit, for example.

The invention also relates to a vehicle roof which is designed for a motor vehicle or which is part of a motor vehicle. Like the roof module described above, this vehicle roof comprises a roof skin, a support structure and at least one sensor module and can have the same features individually or in any combination in this regard, which is why reference is made to the descriptions of the roof module above. The vehicle roof can be an integrated component of a vehicle structure such that it is not mountable or detachable as a separate unit. The vehicle roof can also comprise a roof module of the kind described above, whose features are realized individually or in any combination.

The invention also relates to a motor vehicle which comprises a roof module of the kind described above. The motor vehicle can generally be any road-bound, rail-bound or water-bound vehicle, but it is preferably a passenger car or a commercial vehicle.

Further advantages and advantageous embodiments of the subject matter of the invention can be derived from the description, the drawing and the patent claims.

Embodiments of a vehicle roof module according to the invention are illustrated schematically simplified in the drawing and are described in more detail hereinafter.

BRIEF DESCRIPTIONS OF THE DRAWINGS

DETAILED DESCRIPTION

Figure 1:
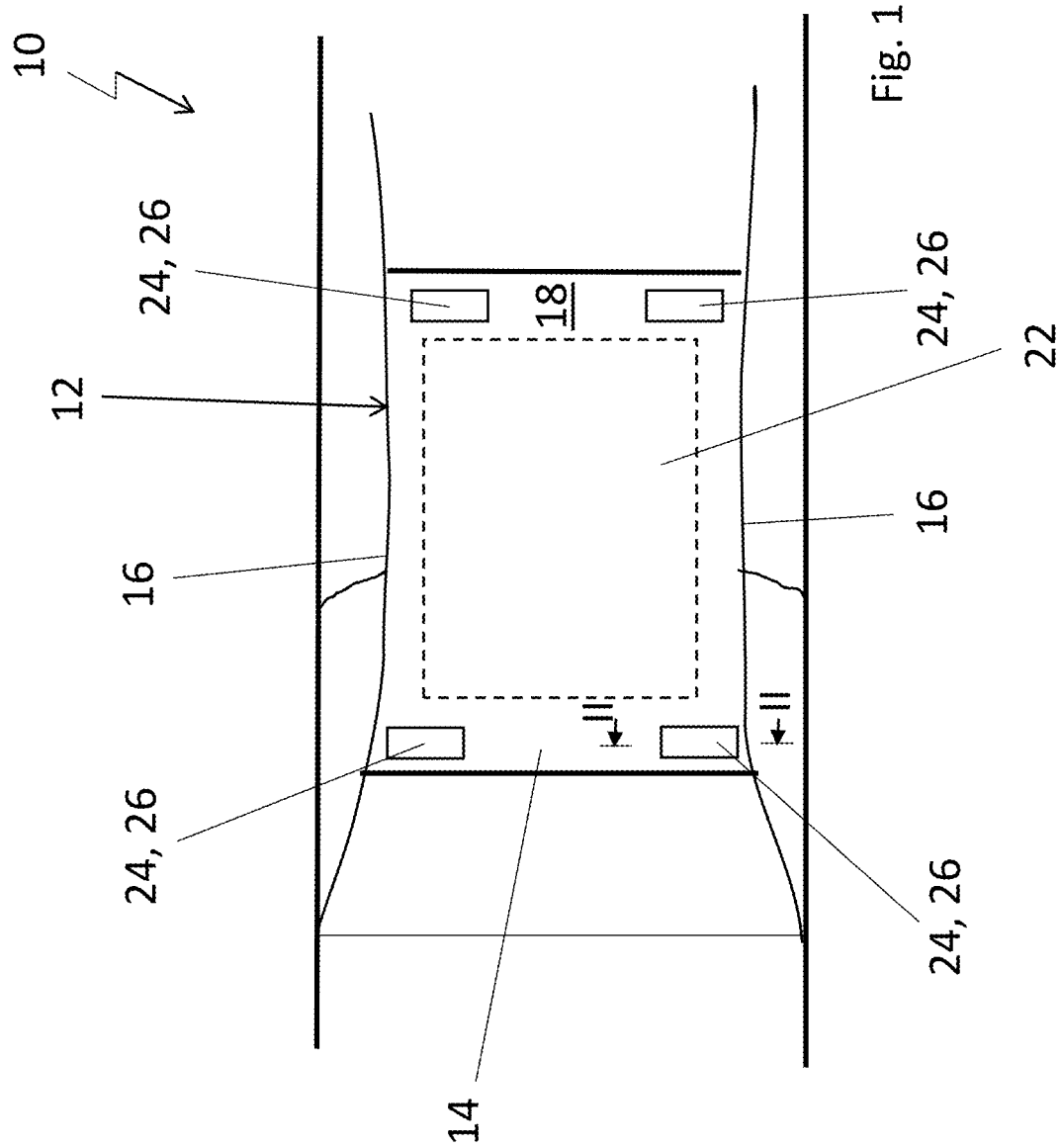
FIG. 1 shows a top view of a vehicle roof having a roof module according to the invention.

FIG. 1 illustrates a motor vehicle 10 which is formed as a passenger car and has a vehicle roof 12 which overstretches a vehicle interior. Vehicle roof 12 comprises a roof module 14 which is disposed between roof side rails 16, which are disposed on either side of a vertical longitudinal center roof plane and which form the lateral edges of vehicle roof 12. Roof side rails 14 are components of a vehicle body representing a vehicle shell structure.

Figure 2:
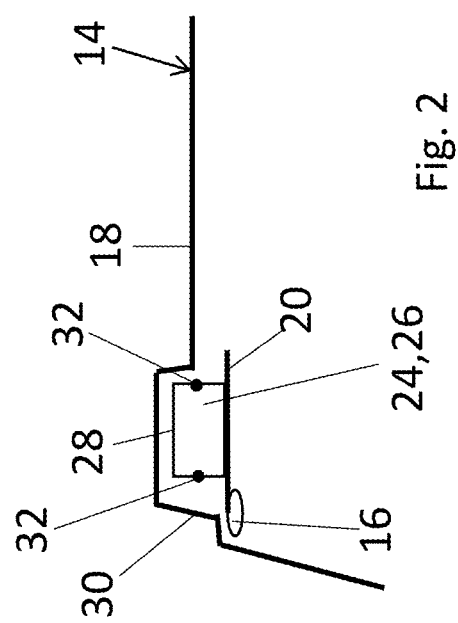
FIG. 2 shows a sectional view of the vehicle roof according to FIG. 1 along line II-II in FIG. 1.

As can be gathered from FIG. 2, roof module 14 comprises a roof skin 18 and a frame-like support structure 20, which is a roof substructure and forms an intersection of roof module 14 with roof side rails 16.

In a central area of skin 18, a transparent roof portion 22 is formed through which light can enter a vehicle interior.

Roof module 14 is formed as a roof sensor module (RSM) which is provided with devices that allow the respective motor vehicle to be driven autonomously. To this end, roof module 14 has a sensor technology which comprises a sensor module 24 in each of the four corner areas of roof module 14, sensor module 24 being provided with environment sensors 26 by means of which the vehicle environment can be detected for realizing autonomous driving. Environment sensors 26 are each disposed in a housing 28 of respective sensor module 24, which is disposed on support structure 20.

Roof skin 18 covers sensor modules 24 and has a side wall 30 in the area of each sensor module 24, side walls 30 forming sensor see-through portions for respective environment sensors 26. By evaluating the measuring signals of environment sensors 26 by means of a control device of motor vehicle 10, a respective traffic situation is determinable such that motor vehicle 10 can autonomously or independently adjust to the respective traffic situation and act accordingly.

Environment sensors 26 can have various designs and comprise a lidar sensor, a radar sensor, a camera and/or another suitable sensor, for example.

Side walls 30 of roof skin 18 are transparent for the wavelengths used by environment sensors 26. In particular, side walls 30 or areas of the side walls are transparent for wavelengths between 200 nm and 2000 nm and/or for radar beams.

Figure 3:
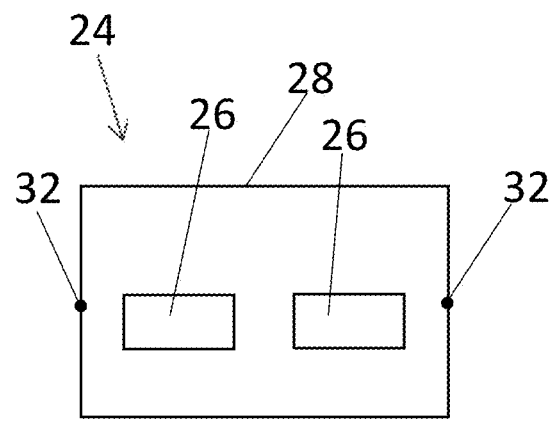
FIG. 3 shows a schematic view of a sensor module of the vehicle roof according to FIG. 1.
Figure 4:
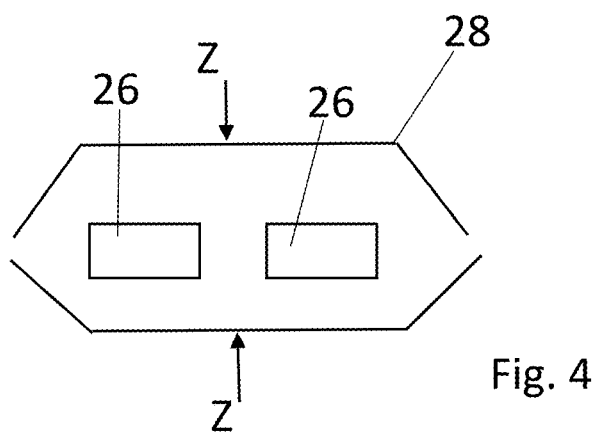
FIG. 4 shows the sensor module according to FIG. 3 in an accident situation.
Figure 5:
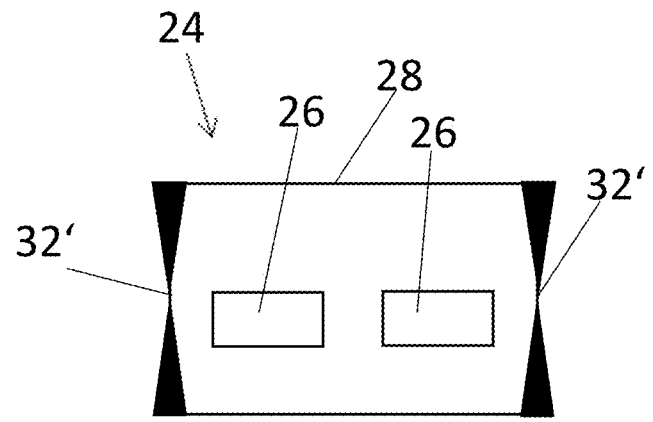
FIG. 5 shows a schematic view of a sensor module of the vehicle roof according to FIG. 1 with an alternate breaking point.

Housings 28 of sensor modules 24 of roof module 14 each have defined material weakening areas which are realized by respective predetermined breaking points 32. For example, predetermined breaking points 32 are formed as rivet-like material taperings 32' (FIG. 5) in sheet-metal or plastic of which housing 28 is produced. Thus, it can be achieved in an accident situation that kinetic energy which acts on respective housing 28 is absorbed because of housing 28 breaking in the area of predetermined breaking points 32 and not transferred from housing 28 to support structure 20, because in this case respective sensor module 24 would be at risk of pushing support structure 20 towards the vehicle interior, at least in sections, whereby vehicle occupants would be put in danger. The behavior of sensor modules 24 in the described accident situation is Illustrated in FIGS. 3 and 4. FIG. 3 shows a sensor module 24 in normal condition, meaning in operable condition. On the contrary, in the situation illustrated in FIG. 4, sensor housing 28 has been destroyed by breaking in a defined manner at predetermined breaking points 32.

Figure 6:
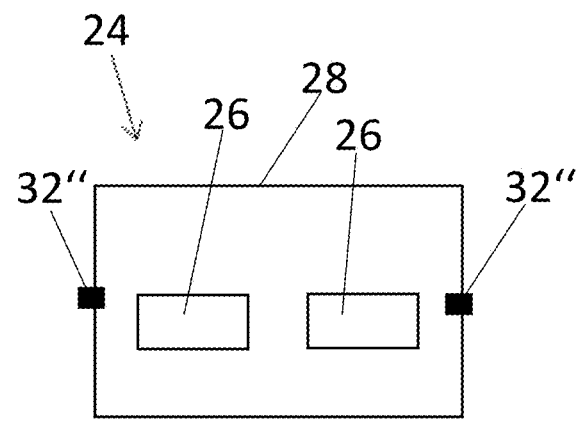
FIG. 6 shows a schematic view of a sensor module of the vehicle roof according to FIG. 1 with an alternate breaking point.

Housings 28 of sensor modules 24 can also have material weakening areas which are formed by a predetermined bending area which is formed on housing 28 instead of predetermined breaking points 32 or realized by connecting means 32" (FIG. 6), such as an adhesive bond, a rivet, a screw connection, a catch mechanism, a welded seam, a soldered seam and/or the like. The connecting means detach when corresponding forces are applied.

The invention claimed is:

1. A roof module for a motor vehicle, comprising:
    a support structure, a roof skin, which is disposed on the support structure, and
    at least one sensor module having at least one environment sensor for detecting a vehicle environment and having at least one housing for accommodating the environment sensor,
    wherein the housing of the sensor module is disposed on the support structure and has a construction which collapses or is deformed when defined external forces are applied such that deformation forces, which are exerted by the sensor module on the support structure or on another roof module component, are reduced,
    wherein the support structure is a frame-like support structure which is a roof sub-structure and forms an intersection of the roof module with roof side rails; and
    wherein the roof skin covers the sensor module and its housing.

2. The roof module according to claim 1, wherein the construction of the housing has a defined material weakening area such that the housing breaks and/or is deformed in a defined manner when external forces are applied.

3. The roof module according to claim 2, wherein the material weakening area comprises a predetermined breaking point or a predetermined bending area.

4. The roof module according to claim 2, wherein the material weakening area comprises a tapering of a housing wall of the housing.

5. The roof module according to claim 2, wherein the material weakening area is configured to form a connection between two sections of the housing.

6. A roof module for a motor vehicle, comprising:
    a support structure, a roof skin, which is disposed on the support structure, and at least one sensor module having at least one environment sensor for detecting a vehicle environment and having at least one housing for accommodating the environment sensor, wherein the housing of the sensor module is disposed on the support structure and has a construction which collapses or is deformed when defined external forces are applied such that deformation forces, which are exerted by the sensor module on the support structure or on another roof module component, are reduced,
    wherein the construction of the housing has a defined material weakening area such that the housing breaks and/or is deformed in a defined manner when external forces are applied,
    wherein the material weakening area is configured to form a connection between two sections of the housing, and
    wherein the connection comprises an adhesive bond, a rivet, a screw connection, a catch mechanism, a welded seam, a soldered seam and/or the like.

7. The roof module according to claim 1, wherein the housing has structural elements on which the material weakening area is formed.

8. The roof module according to claim 1, wherein the housing is at least partly made of plastic.

9. The roof module according to claim 1, wherein the housing is a thin-walled metal housing, at least in sections.

10. The roof module according to claim 1, wherein the roof skin covers the environment sensor.

11. A motor vehicle, comprising a roof module according to claim 1.

* * * * *